3,179,721
BINARY BLENDS OF STYRENE/ACRYLONITRILE COPOLYMER AND POLYSULFIDE RUBBER AND METHODS FOR PREPARING THE SAME
James A. Herbig and Ival O. Salyer, Dayton, Ohio, assignors to Monsanto Company, a corporation of Delaware
No Drawing. Filed July 21, 1960, Ser. No. 44,283
8 Claims. (Cl. 260—898)

This invention relates to styrene/acrylonitrile copolymers. In one aspect, this invention relates to styrene/acrylonitrile copolymer compositions comprising binary polyblends of styrene/acrylonitrile copolymers and solid polysulfide rubbers. In another aspect, this invention relates to methods for making binary polyblends of styrene/acrylonitrile copolymers and polysulfide rubbers.

Copolymers of styrene with acrylonitrile, especially those containing from 90 to 50 parts by weight styrene and correspondingly from 10 to 50 parts by weight acrylonitrile, constitute an important class of commercial resins, finding widespread use as an injection molding material. Unfortunately, styrene/acrylonitrile copolymers of this type have very limited flexibility. In fact, they are comparatively brittle material which do not show a definite yield point. The tensile elongation of such styrene/acrylonitrile copolymers is of the order of only a few percent and the flexural deflection is very small. Thus, many styrene/acrylonitrile copolymers lack toughness. Although plasticizers can be used to improve the toughness of styrene/acrylonitrile copolymers, the plasticized copolymer invariably has a low heat distortion point or softening point which restricts its use and the plasticizers tend to exude from the copolymer over a period of time.

We have discovered that the toughness characteristics and the heat resistant properties of styrene/acrylonitrile copolymers can be improved by blending into said styrene/acrylonitrile copolymers a polysulfide rubber.

An object of this invention is to provide improved styrene/acrylonitrile copolymer compositions.

Another object of this invention is to provide binary polyblend compositions of styrene/acrylonitrile and a polysulfide rubber.

Another object of this invention is to improve the toughness properties of a styrene/acrylonitrile copolymer composition without significantly lowering the heat distortion temperature of said copolymer.

Another object of this invention is to improve the toughness of a styrene/acrylonitrile copolymer composition without significantly reducing the tensile strength or the flexural strength of said copolymer.

Another object of this invention is to improve the temperature resistance of a styrene/acrylonitrile copolymer composition.

Other aspects, objects and advantages of this invention will be apparent from a consideration of the accompanying disclosure and the appended claims.

In accordance with this invention, improved styrene/acrylonitrile copolymer compositions are made by incorporating a solid polysulfide rubber in said styrene/acrylonitrile copolymer to form a binary polyblend of the same. The novel binary polyblend compositions of this invention comprise a major proportion of a styrene copolymer and a minor proportion of a polysulfide rubber. Thus, the amount of polysulfide rubber incorporated in the styrene/acrylonitrile copolymer may be as small as 1.0% by weight and as high as 50.0% by weight. Although some improvement in some of the physical properties is obtained for all polyblend compositions within this broad range, greater improvements in specific properties are accomplished with particular compositions within this broad range. For example, significant improvement in toughness properties are obtained using smaller amounts of the polysulfide rubber, preferably within the range of from 1.0% by weight to 15% by weight; whereas greater improvement in the toughness properties are obtained using larger amounts of the polysulfide rubber, preferably in the range of from 30.0% by weight to 50% by weight.

The copolymers of styrene/acrylonitrile used in the novel polyblend compositions of this invention include copolymers wherein styrene and acrylonitrile are the sole monomers subjected to polymerization, as well as copolymers prepared from these comonomers which also contain other polymerizable unsaturated comonomers in an amount preferably not exceeding 15 weight percent of the total comonomers of styrene and acrylonitrile. Examples of such polymerizable unsaturated comonomers which may be present include $\alpha$-methyl styrene, vinyl toluene, ethyl acrylate, butyl acrylate, methyl methacrylate, and the like. The copolymer produced, even if other polymerizable unsaturated comonomers are present, should have a high molecular weight. The styrene/acrylonitrile copolymers used in this invention comprise from 90 to 50 parts by weight styrene and, correspondingly, from 10 to 50 parts by weight acrylonitrile; however, other styrene/acrylonitrile copolymer compositions outside this range can also be used with less advantageous results.

The styrene/acrylonitrile copolymers employed in the binary polyblend compositions of this invention are commercially available products and can be made by any of the known styrene/acrylonitrile copolymerization techniques for monomeric material comprising styrene and acrylonitrile. One common technique is mass polymerization when the only material present in the reaction mixture is a monomer plus any catalyst and any modifier that may be used to affect the molecular weight and no added solvent or other reaction medium is present. Suitable catalysts for use are those that promote free radicals, e.g., peroxy type and azo type catalysts. Examples of such catalysts include benzoyl peroxide, ditertiarybutyl peroxide, dimethyl phenyl hydroperoxymethane, and $\alpha,\alpha'$-azo-bisisobutyronitrile. The copolymerization can also be effected by the solvent polymerization technique which is similar to the mass polymerization technique except that a solvent for the monomers and/or polymers is also present during the polymerization. The copolymerization can also be effected advantageously by suspension or emulsion polymerization techniques. Each of these techniques involves the use of a non-solvent for the monomer and polymer, but in the suspension technique the particles of monomer and ultimately the polymer are comparatively large, while in the emulsion procedure the particles are quite small and the product is a stable latex. For suspension polymerization, a reaction medium such as water is used together with a small amount of a suspending agent, for example, tricalcium phosphate, a vinyl acetate-maleic anhydride copolymer product, or the like, to give a suspension of particles in the initial mixture which are not of sufficiently small size as to result in a permanently stable latex as the product. To effect emulsion polymerization, a sufficient amount of emulsifying agent, for example, a water-soluble salt of a sulfonated long-chain alkyl aromatic compound, is employed in suitable quantity along with vigorous agitation whereby an emulsion of the reactants in water is formed and the product is obtained in the form of a latex. The latex can then be coagulated, if desired, by known methods and the polymer separated from the water. Conventional recipes and procedures for effecting mass, suspension, and emulsion copolymerization of styrene with acrylonitrile are so well known to those skilled in the art that they will not be reiterated here. Emulsion and suspension polymerization can be effected at temperatures which are chosen in accordance with the catalyst system used but which may, for example, be from 50° C. to 100° C. Mass polymerization is usually most advantageously affected at temperatures within the range of 25° C. to 125° C.

The polysulfide rubbers utilized in the polyblend compositions of this invention are solid materials which are usually described as being polythiopolymercaptans which may be produced, for example, according to the process described in U.S. Patent 2,466,963. These polysulfide polymers are commercially available and are sold under the trade name "Thiokol." Examples of such commercially available polysulfide rubbers include "Thiokol FA" and "Thiokol ST" products. "Thiokol FA," which is defined as being a condensation polymer formed by reacting sodium polysulfide with a mixture of ethylene dichloride and dichloroethyl formal, has a specific gravity of 1.34 and is terminated in a hydroxyl group. "Thiokol ST," which is said to be a condensation polymer formed by reacting sodium polysulfide with dichloroethyl formal, containing 2% trichloropropane, has a specific gravity of 1.25 and is terminated in a thiol group. Each of these polysulfide rubbers has a molecular weight above 20,000 but the "Thiokol FA" product has a higher molecular weight than the "Thiokol ST" product. The polysulfide rubbers as described herein are merely examples of preferred materials which can be used in making the binary polyblend compositions of this invention; other solid polysulfide rubbers can also be used.

The binary polyblend compositions of this invention are prepared by intimately admixing the styrene/acrylonitrile copolymer and the polysulfide rubber together. These components, which may be in any conventional form, may be mixed in any order although usually the polysulfide rubber is added to the styrene/acrylonitrile copolymer since the polysulfide rubber is present in a minor amount. Preferably, the styrene/acrylonitrile copolymer and the polysulfide rubber are admixed in a suitable container to form a rough admixture which is then further mixed on a conventional mixing machine of the type normally used for making rubber or plastics, e.g., mill rolls, an extruder, or a Banbury mixer. However, if desired, the styrene/acrylonitrile copolymer can first be placed on the mill rolls and, after a smooth rolling bank has formed in the nip of the rolls the polysulfide rubber added to mixture. Regardless of the method by which the mixing of the ingredients is accomplished, it is necessary that the components be admixed together or worked under sufficient heat and pressure to insure sufficient dispersion of the polysulfide rubber in the styrene/acrylonitrile copolymer to form a homogeneous material. The temperature at which this working or mastication is conducted is not critical so long as the temperature is at least above that at which the styrene/acrylonitrile copolymer fuses but below the temperature where decomposition takes place. Usually a temperature above about 300° F. or 325° F. and less than about 350° F. or 375° F. is sufficient to obtain an adequately intimate combination of the materials. If desired, suitable minor ingredients can also be included in the binary polyblends of this invention, including such ingredients as fillers, dyes, pigments, stabilizers, and the like.

The advantages, desirability and usefulness of the present invention are illustrated by the following example.

EXAMPLE 1

Styrene/acrylonitrile copolymer polyblends containing varying proportions of "Thiokol ST" and "Thiokol FA" polysulfide rubbers were prepared by mechanically milling the various admixtures on a 3 x 8 in. Thropp mill rolls at 174° C. A rough mix was first prepared from the preformed polymers in powdered or pelleted form in a stainless steel beaker and then this rough mix was placed on the heated mill rolls and thoroughly homogenized by intensive hot milling for 5 minutes or until an adequate dispersion was obtained. The blends were then sheeted and stripped from the mill rolls. After sufficient cooling, the sheets were cut into 1 to 2 inch squares for convenient feeding to an Abbe grinder for grinding into pellet size for injection molding on a 1-ounce Watson-Stillman machine.

The physical properties of the blends were then determined on the injection molded samples and are reported in Table I. These properties were determined according to the standard ASTM procedures, more specifically, tensile strength and elongation were determined according to ASTM D-882-46, flexural strength and deflection were determined according to ASTM D-790-49T, notched impact strength was determined by the Izod method as set forth in ASTM D-256-47T, and the Clash-Berg data were determined according to ASTM D-1043-51.

*Table I.—Properties of styrene/acrylonitrile copolymer and polysulfide rubber polyblend compositions*

| Composition, percent | | | Tensile properties | | | | Flexural properties | | Notched impact strength, ft.-lb./in. | Clash-Berg data | | |
|---|---|---|---|---|---|---|---|---|---|---|---|---|
| Styrene/ acrylonitrile copolymer [1] | Solid polysulfide rubber [2] | Solid polysulfide rubber [3] | Yield | | Failure | | Strength, p.s.i. | Deflection, inches | | ° C. $T_f$ | ° C. $T_{2000}$ | SFR |
| | | | Strength, p.s.i. | Elong., percent | Strength, p.s.i. | Elong., percent | | | | | | |
| 100 | | | | | 11,400 | 1.8 | 18,374 | 0.24 | 0.53 | 100.8 | 113.9 | 13.1 |
| 97.5 | 2.5 | | 11,207 | 6.9 | 8,460 | 12.8 | 20,357 | 0.48 | 1.0 | 100.0 | 110.0 | 10.0 |
| 95.0 | 5.0 | | 10,767 | 6.7 | 7,539 | 17.7 | 19,562 | 0.80 | 0.68 | 100.0 | 112.0 | 12.0 |
| 90.0 | 10.0 | | 10,396 | 6.7 | 7,910 | 17.8 | 17,345 | 0.80 | 0.47 | 95.2 | 109.7 | 14.5 |
| 80.0 | 20.0 | | 9,943 | 6.7 | 7,498 | 14.7 | 16,375 | 0.23 | 0.38 | 90.2 | 108.3 | 16.1 |
| 70.0 | 30.0 | | | | 7,322 | 8.5 | 9,582 | 0.17 | 0.39 | 82.5 | 107.4 | 24.9 |
| 60.0 | 40.0 | | | | 5,824 | 7.5 | 6,536 | 0.15 | 0.55 | −22.5 | 106.0 | 128.5 |
| 50.0 | 50.0 | | | | 3,035 | 4.0 | 5,513 | 0.17 | 0.63 | | | |
| 97.5 | | 2.5 | 10,108 | 6.7 | 8,185 | 22.4 | 20,307 | 0.30 | 0.68 | 98.7 | 113.5 | 14.8 |
| 95.0 | | 5.0 | 10,698 | 6.7 | 8,638 | 14.4 | 19,381 | 0.70 | 0.88 | 99.9 | 112.5 | 12.6 |
| 90.0 | | 10.0 | 9,950 | 6.7 | 8,501 | 22.5 | 16,681 | 0.47 | 0.62 | 98.0 | 110.0 | 12.0 |
| 80.0 | | 20.0 | | | 8,199 | 8.5 | 12,647 | 0.18 | 0.47 | 98.8 | 111.1 | 12.3 |

[1] Bakelite C-11 styrene/acrylonitrile copolymer containing 72% by weight styrene and 28% by weight acrylonitrile.
[2] Thiokol ST solid polysulfide rubber.
[3] Thiokol FA solid polysulfide rubber.

The data in Table I clearly show the improvement in toughness to be obtained by blending a small amount of a solid polysulfide rubber into a styrene/acrylonitrile copolymer. For example, the flexural deflection of the styrene/acrylonitrile copolymer was increased from 0.24 inch to a value greater than 0.80 inch, the limit of the particular test equipment used, by blending in 5.0 and 10.0 weight percent of "Thiokol ST" polysulfide rubber. In addition, the blending of either 5.0 weight percent or 10.0 weight percent of either "Thiokol ST" or "Thiokol FA" polysulfide rubbers raised the tensile elongation at failure from 1.8% to values of 17.7%–17.8% and 14.4%–22.5%, respectively. The improvements in toughness were less using the higher concentrations of polysulfide rubber; however, the improvements were still substantial, as for example, the increase in tensile elongation at failure was raised from 1.8% to 7.5% by blending in 40.0 weight percent "Thiokol ST" polysulfide rubber. Although these increases in toughness properties were obtained with some slight loss in tensile strength at failure, there was obtained an increase in flexural strength, particularly with the lower amounts of the polysulfide rubber. These improvements in toughness properties, particularly at the lower concentrations of polysulfide rubber, were obtained without adversely affecting the notched impact strength of the styrene/acrylonitrile copolymer, and in fact, resulted in an improvement in the impact strength, as will be noted, for example by the increase from 0.53 ft.-lb./in. to 1.0 ft.-lb./in. for a polyblend composition containing 2.5 weight percent "Thiokol ST" polysulfide rubber.

The improvement in the temperature resistance properties of a styrene/acrylonitrile copolymer rubber by formation of a polyblend composition with a polysulfide rubber are also shown in Table I. The brittle temperature ($T_f$) is the temperature at which the stiffness modulus is 135,000 p.s.i. and the rubber temperature ($T_{2000}$) is the temperature at which the stiffness modulus is 2000 p.s.i. The stiff-flex range (SFR) is determined by difference. The brittle temperature is an indication of the brittleness of the material as a function of temperature since the material will break without bending at temperatures below this temperature. The rubber temperature is a measure of the heat resistance of the polymer since at temperatures above this temperature, the material has no weight- or load-bearing characteristics. It is particularly desirable to obtain a polymer composition having a high stiff-flex range because this measurement is an indication that the change in physical characteristics of the polymer composition would be gradual over a wide temperature range and that failure of the material will not occur suddenly or immediately upon a change in temperature. It will be noted from the data in Table I that the incorporation of larger amounts of polysulfide rubber in the styrene/acrylonitrile copolymer resulted in large increases in the stiff-flex range of the composition. For example, the addition of 40.0 weight percent "Thiokol ST" polysulfide rubber in the styrene/acrylonitrile copolymer increased the stiff-flex range from 13.1° C. to 128.5° C., an approximately ten-fold increase. A polyblend product of this composition would have many more end-uses than would a styrene/acrylonitrile copolymer not containing 40.0 weight percent polysulfide rubber because this composition is less affected by changes in temperature.

The binary polyblend compositions obtained in this invention are clear or translucent products which can be flexed repeatedly without rupture. The compositions of this invention can be subjected to injection or compression molding and further operations which are standard for styrene/acrylonitrile copolymers. These compositions can be used to make molded structures as well as plastic sheets suitable for cutting or otherwise converted to an intended use. They can also be mixed with other materials, such as pigments, plasticizers, natural and synthetic resins, and the like, according to procedures well known to those skilled in the art.

Reasonable variation and modification of the invention as described are possible, the essence of which is that there have been provided binary polyblend compositions of styrene/acrylonitrile copolymer comprising a major amount of a styrene/acrylonitrile and a minor amount of a polysulfide rubber, and methods for preparing the same.

We claim:

1. A solid, tough binary polyblend composition comprising styrene/acrylonitrile copolymer containing from 50% to 90% by weight of styrene and from 50% to 10% by weight of acrylonitrile, said composition containing from 1% to 50% by weight of a solid polyalkylene polysulfide rubber.

2. A solid styrene/acrylonitrile copolymer polyblend composition of improved toughness comprising styrene/acrylonitrile copolymer containing from 50% to 90% by weight of styrene and from 50% to 10% by weight of acrylonitrile, said composition containing from 1% to 15% by weight of a solid polyalkylene polysulfide rubber.

3. A solid, tough styrene/acrylonitrile copolymer polyblend composition containing from 50% to 90% by weight of styrene and correspondingly from 50% to 10% by weight acrylonitrile, based on the weight of the comonomers polymerized, and from 1% to 50% by weight of a solid polyalkylene polysulfide rubber.

4. A styrene/acrylonitrile copolymer polyblend composition of improved toughness comprising about 95% by weight of a styrene/acrylonitrile copolymer containing about 72% by weight styrene and about 28% by weight acrylonitrile, based on the weight of comonomers polymerized, and about 5% by weight solid polyalkylene polysulfide rubber.

5. A styrene/acryonitrile copolymer polyblend composition of improved toughness comprising about 90% by weight of a styrene/acrylonitrile copolymer containing about 72% by weight styrene and about 28% by weight acrylonitrile, based on the weight of comonomers polymerized and about 10% by weight solid polyalkylene polysulfide rubber.

6. A method for improving the toughness properties of a styrene/acrylonitrile copolymer composition, said copolymer containing from 50% to 90% by weight of styrene and from 50% to 10% by weight of acrylonitrile, said method comprising mechanically admixing from 1 to 15% by weight of a preformed, solid polyalkylene polysulfide rubber with said styrene/acrylonitrile copolymer for a period of time sufficient to form a homogeneous mixture thereof.

7. A styrene/acrylonitrile copolymer polyblend composition of improved temperature resistance comprising from 30% to 50% by weight of a solid polyalkylene polysulfide rubber and from 50% to 70% by weight of a styrene/acrylonitrile copolymer containing from 50% to 90% by weight of styrene and from 50% to 10% by weight of acrylonitrile.

8. A styrene/acrylonitrile copolymer polyblend composition of improved temperature resistance comprising about 40% by weight of a solid polyalkylene polysulfide rubber and about 60% by weight of a styrene/acrylonitrile copolymer containing about 72% by weight styrene and about 28% by weight acrylonitrile.

References Cited by the Examiner
UNITED STATES PATENTS 2,469,141   5/49   Alexander _____ 260—874

OTHER REFERENCES

Schildknecht: "Vinyl and Related Polymers," John Wiley and Sons, Inc., New York, page 53.

LEON J. BERCOVITZ, *Primary Examiner.*

D. ARNOLD, WILLIAM H. SHORT, *Examiners.*